United States Patent
Pizzinat et al.

(10) Patent No.: US 10,454,582 B2
(45) Date of Patent: Oct. 22, 2019

(54) TRANSPONDER FOR A RADIO-OVER-FIBRE TRANSMISSION SYSTEM ALLOWING RETRANSMISSION FROM THE ANTENNA MANAGEMENT INTERFACE

(71) Applicant: Orange, Paris (FR)

(72) Inventors: Anna Pizzinat, Verriers le Buisson (FR); Philippe Chanclou, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/575,658

(22) PCT Filed: May 17, 2016

(86) PCT No.: PCT/FR2016/051159
§ 371 (c)(1),
(2) Date: Nov. 20, 2017

(87) PCT Pub. No.: WO2016/185130
PCT Pub. Date: Nov. 24, 2016

(65) Prior Publication Data
US 2018/0115368 A1    Apr. 26, 2018

(30) Foreign Application Priority Data

May 20, 2015  (FR) ..................... 15 54533

(51) Int. Cl.
*H04B 10/2575* (2013.01)
*H04B 10/27* (2013.01)
(Continued)

(52) U.S. Cl.
CPC . *H04B 10/25759* (2013.01); *H04B 10/25758* (2013.01); *H04B 10/27* (2013.01);
(Continued)

(58) Field of Classification Search
CPC ........ H04B 10/25758; H04B 10/25759; H04B 10/27; H04J 14/0209; H04J 14/0272; H04J 2203/0058; H04W 88/085
See application file for complete search history.

(56) References Cited

U.S. PATENT DOCUMENTS

| | | | |
|---|---|---|---|
| 2005/0105552 A1* | 5/2005 | Osterling | H04W 88/085 370/466 |
| 2009/0170543 A1* | 7/2009 | Mostafa | H04W 56/0045 455/502 |

(Continued)

FOREIGN PATENT DOCUMENTS

| | | |
|---|---|---|
| JP | 2014090240 A | 5/2014 |
| WO | 2014061552 A1 | 9/2016 |

OTHER PUBLICATIONS

English translation of the Written Opinion of the International Searching Authority dated Jul. 27, 2016 for corresponding International Application No. PCT/FR2016/051159, filed May 17, 2016.
(Continued)

*Primary Examiner* — Omar S Ismail
(74) *Attorney, Agent, or Firm* — David D. Brush; Westman, Champlin & Koehler, P.A.

(57) ABSTRACT

A transmission system includes: an optical transmission module capable of modulating a first digital radio signal in order to obtain a first optical signal; an optical reception module capable of receiving a second optical signal and demodulating same in order to obtain a demodulated radio signal; and a digitizing module capable of digitizing the demodulated radio signal in order to obtain a second digital radio signal. The transmission module includes: a module for adding a first management signal to the first digital radio signal, the rate of the first management signal being less than that of the first digital radio signal. The optical digitizing module includes an extraction module capable of extracting a second management signal from the demodulated radio signal, the rate of the second management signal being less than that of the second digital radio signal.

10 Claims, 3 Drawing Sheets

Figure 1:
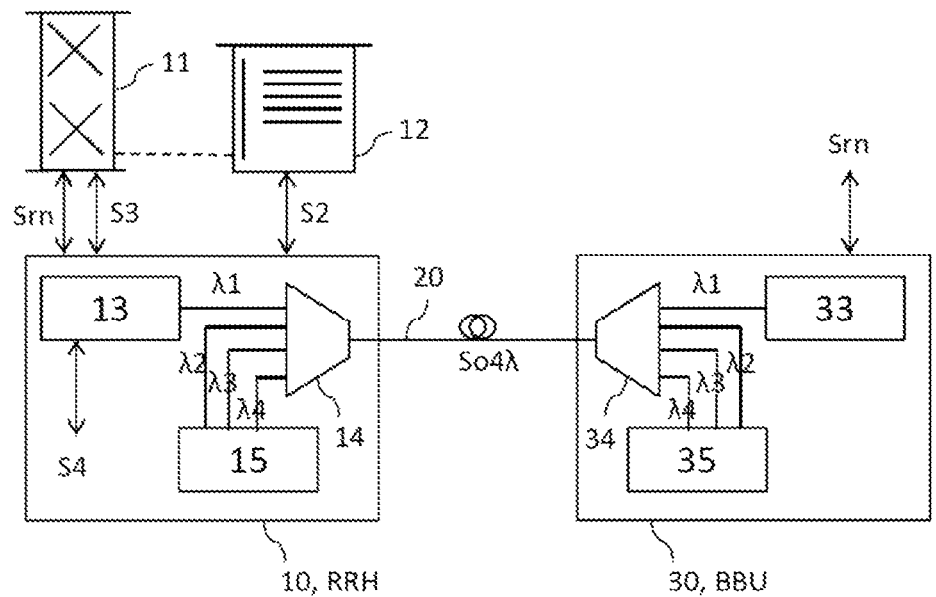

(51) Int. Cl.
*H04J 14/02* (2006.01)
*H04W 88/08* (2009.01)
(52) U.S. Cl.
CPC ....... *H04J 14/0272* (2013.01); *H04W 88/085* (2013.01); *H04J 14/0209* (2013.01); *H04J 2203/0058* (2013.01)

(56) References Cited

U.S. PATENT DOCUMENTS

| | | | | |
|---|---|---|---|---|
| 2011/0013911 A1* | 1/2011 | Alexander | ............. | H04B 10/29 398/79 |
| 2013/0230328 A1* | 9/2013 | Fan | .................. | H04B 10/25759 398/115 |
| 2015/0229397 A1* | 8/2015 | Shibata | ............ | H04B 10/25754 398/115 |

OTHER PUBLICATIONS

International Search Report dated Jul. 27, 2016 for corresponding International Application No. PCT/FR2016/051159, filed May 17, 2016.
Written Opinion of the International Searching Authority dated Jul. 27, 2016 for corresponding International Application No. PCT/FR2016/051159, filed May 17, 2016.
"Energy Efficient Transmission Techniques for LTE", IEEE Communications Magazine, IEEE Service Center, Piscataway, US, vol. 51, No. 10, Oct. 1, 2013 (Oct. 1, 2013), pp. 182-190, XP011528709.

* cited by examiner

Fig 4
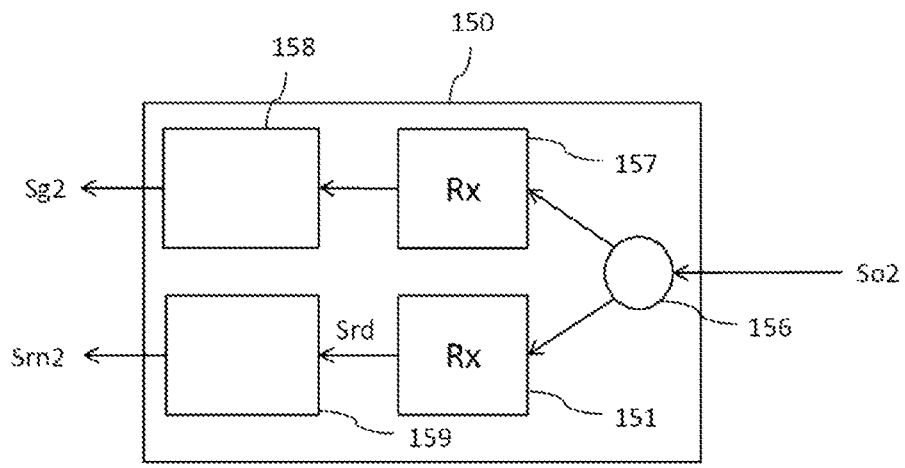
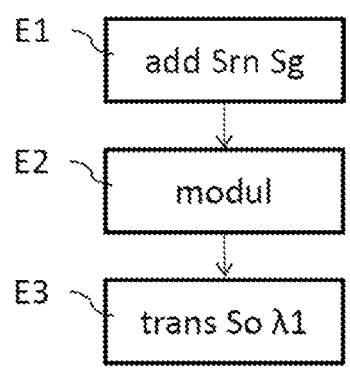
Fig 6
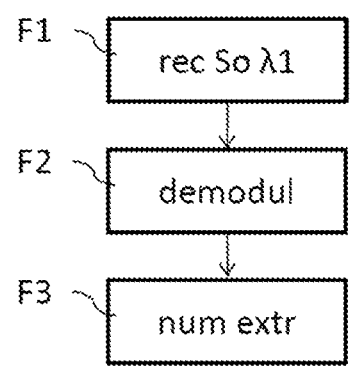
Fig 7

TRANSPONDER FOR A RADIO-OVER-FIBRE TRANSMISSION SYSTEM ALLOWING RETRANSMISSION FROM THE ANTENNA MANAGEMENT INTERFACE

CROSS-REFERENCE TO RELATED APPLICATIONS

This Application is a Section 371 National Stage of International Application No. PCT/FR2016/051159, filed May 17, 2016, which is incorporated by reference in its entirety and published as WO 2016/185130 A1 on Nov. 24, 2016, not in English.

1. FIELD OF THE INVENTION

The patent application lies in the field of mobile telecommunication networks, and more particularly in the field of optical cable links between antenna sites and a site of the transport network.

2. PRIOR ART

A base station of a mobile network may comprise one or more antennas positioned at height, generally on a tower or a pylon. The radio broadcast signal processing is performed by an "RRH" (Remote Radio Head) element, positioned near an antenna, e.g. in the tower or at its foot, thanks to its small size. The digital signal, in turn, is processed by a "BBU" (Base Band Unit) element, which may be positioned far from the antenna, e.g. tens of kilometers away. The RRH and the BBU are linked by an optical fiber, and the transport of the data over this fiber uses the DRoF (Digital Radio over Fiber) protocol.

According to a prior art, the management of the site alarms, the antenna tilt control, and the management of the optoelectronic operating parameters of the DRoF signal reception and transmission chains on the site. i.e. the management of the transponder on the RRH side, take place at the location of the antenna site, and frequently require technicians to travel to this location.

In order for the BBU site to remotely manage information relating to the three aspects mentioned above, i.e. the alarm, tilt and transponder information, one solution is to add three corresponding pairs of wavelengths to the optical signal, in addition to the pair of wavelengths specific to the DRoF signal.

This solution complicates the processing of the optical signal in the RRH and BBU elements, increases the cost of these elements, while adding a strong constraint on interoperability between these elements, particularly when they are manufactured by different suppliers.

One of the purposes of the invention is to overcome these drawbacks of the prior art.

3. DISCLOSURE OF THE INVENTION

The invention will improve the situation with the aid of an optoelectronic transponder for a radio-over-fiber transmission system, comprising:
an optical transmission module capable of modulating a first digital radio signal in order to obtain a first optical signal,
an optical reception module capable of receiving a second optical signal and demodulating same in order to obtain a demodulated radio signal,
a digitizing module capable of digitizing the demodulated radio signal in order to obtain a second digital radio signal,
the transmission module comprising:
an addition module for adding a first management signal to the first digital radio signal, the throughput of the first management signal being less than that of the first digital radio signal,
and the optical digitizing module comprising:
an extraction module capable of extracting a second management signal from the demodulated radio signal, the throughput of the second management signal being less than that of the second digital radio signal.

Thanks to the invention, it is possible for an RRH element of an antenna site and a BBU element of a management center to exchange management signals therebetween, in parallel with the DRoF signal, without adding, as in the prior art, specific wavelengths to these management signals. Indeed, according to the invention, on the signal transmission side, a management signal is added, before its conversion into an optical signal, i.e. in digital radio form, to the DRoF digital radio data signal to be transmitted, and not directly to the optical signal to be transmitted.

Similarly, according to the invention, on the signal reception side, a management signal is extracted from the digital radio signal obtained after conversion of the received optical signal, and not directly from the received optical signal.

In both directions, the management signal thus becomes an integral part of the DRoF digital radio data signal.

As the throughput of the management signal is less than that of the data signal, the impact on the throughput of the DRoF signal is limited.

The characteristics of the optical signal carrying the DRoF signal remain unchanged, notably the wavelength in each of the two directions remains the same. The purely optical part of the radio-over-optical-fiber transmission system, between the RRH and BBU elements, is therefore not impacted by the invention.

Another advantage of the invention is that the processing of the low throughput management signal is possible without a complete processing of the high throughput data signal, which would introduce a latency into the DRoF signal.

According to one aspect of the invention, the addition module is an electronic mixer.

Thanks to this aspect, the operation of adding the management signal is made easier and is inexpensive. Indeed the electronic mixer is a cheap component that makes it possible to combine multiple electronic signals of different frequencies, in this case, to add the low throughput management signal to the high throughput digital radio signal.

According to one aspect of the invention, the digitizing module comprises an amplifier capable of amplifying the demodulated radio signal, and the extraction module is a low-pass electronic filter connected to an output of the amplifier.

Thanks to this aspect, the operation of extracting the management signal is made easier and is inexpensive. Indeed the low-pass filter is a cheap component that makes it possible to sample a part of the digital radio signal at a low sampling rate. In order to extract the management signal from the digital radio signal, it is sufficient for the sampling frequency to be adjusted to the throughput of the management signal.

According to one aspect of the invention, the ratio of the throughput of the first or second radio signal to the throughput of the first or second management signal respectively is greater than or equal to 1000.

Typically, the DRoF radio signal throughput is greater than 1 Gbit/s. Thanks to this aspect, it is possible to carry a management signal of 1 Mbits per second in this DRoF radio signal, without any perceptible impact on the throughput of the DRoF radio signal.

According to one aspect of the invention, the ratio of the throughput of the first radio signal to the throughput of the first management signal is identical to the ratio of the throughput of the second radio signal to the throughput of the second management signal.

Thanks to this aspect, the same components may be implemented symmetrically in a transponder according to the invention, either on the side of the RRH element or on the side of the BBU element.

According to one aspect of the invention, the management signal comprises information relating to alarms detected on a radio antenna site.

According to one aspect of the invention, the management signal comprises information relating to a radio antenna tilt control.

According to one aspect of the invention, the management signal comprises information relating to management of the optoelectronic parameters of the optoelectronic transponder.

Thanks to these three aspects, it is possible to remotely manage a radio antenna site where an RRH element is located, from a remote site where the BBU element is located.

According to one aspect of the invention, the optical transmission module transmits the first optical signal over an optical fiber, and the optical reception module receives the second optical signal over the same optical fiber.

Thanks to this aspect, it is possible for an optoelectronic transponder in an RRH element and an optoelectronic transponder in a BBU element to exchange management information in both directions, even if they are connected to each other by one and the same optical fiber.

The various aspects of the optoelectronic transponder for a radio-over-fiber transmission system, that have just been described, may be implemented independently from each other or in combination with each other.

The invention also relates to a radio-over-optical-fiber transmission system connecting a management center to at least one radio antenna site, the management center comprising an optoelectronic transponder such as that which has just been described, each of the at least one antenna sites also comprising a transponder such as that which has just been described, with which a separate pair of wavelengths is associated.

With two transponders according to the invention, a transmission system is obtained between an RRH element and a BBU element allowing the remote management of the antenna site, without any modification of the optical infrastructure or of the optical signal processing operations.

In addition, the invention is easily adaptable to a configuration wherein multiple antenna sites have to be managed by the same management center. Indeed, by associating with each antenna site, i.e. with the transponder of the RRH element thereof, a pair of wavelengths which is unique to same, it is possible to link multiple antenna sites to a single BBU management center, via only one or two optical fibers (only one for both transmission directions, or one for each direction).

The various antenna sites may, for example, be linked in cascade with the aid of OADM (Optical Add-Drop Multiplexer) elements adding and extracting the appropriate wavelength of the pair of wavelengths corresponding to an RRH element.

Alternatively, the BBU element of the management center may be linked by a single fiber or two fibers to a WDM multiplexer serving each of the antenna sites via one or two dedicated fibers with the pair of wavelengths corresponding to the RRH element.

The invention also relates to a method for adding a management signal into a digital radio signal for a radio-over-fiber transmission system, implemented by a first transponder compliant with that which has just been described and comprising:
  a step of modulating the digital radio signal in order to obtain an optical signal,
  a step of transmitting the optical signal to a second transponder compliant with that which has just been described,
the method further comprising a step of adding the management signal to the first digital radio signal, the throughput of the management signal being less than that of the digital radio signal.

Finally the invention relates to a method for extracting a management signal from a demodulated radio signal for a radio-over-fiber transmission system, implemented by a first transponder compliant with that which has just been described and comprising:
  a step of receiving an optical signal from a second transponder compliant with that which has just been described,
  a step of demodulating the optical signal received in order to obtain a demodulated radio signal,
  a step of digitizing the demodulated radio signal in order to obtain a digital radio signal,
the method further comprising a step of extracting the management signal from the demodulated radio signal, the throughput of the management signal being less than that of the digital radio signal.

4. DESCRIPTION OF THE FIGURES

Figure 5:
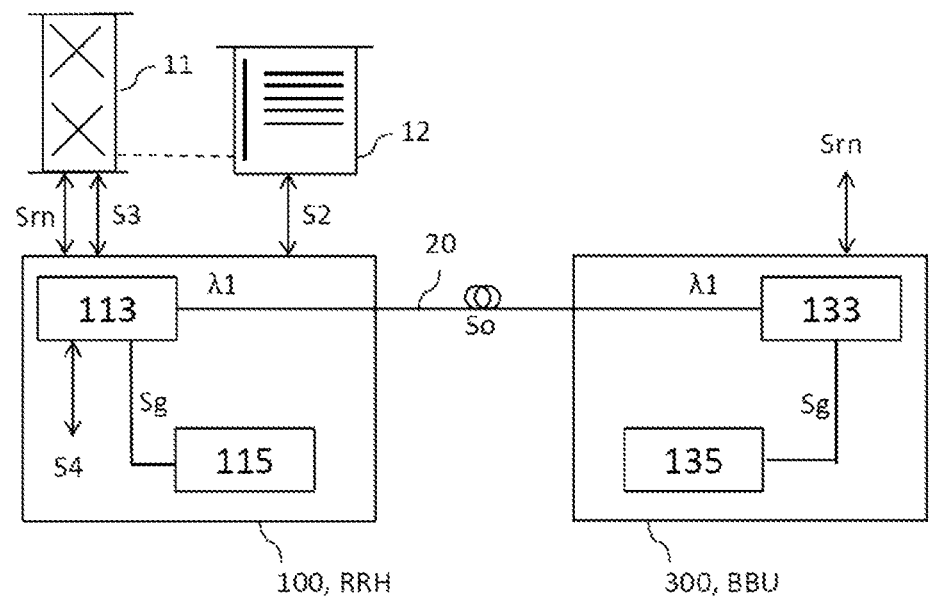
Figure 2:
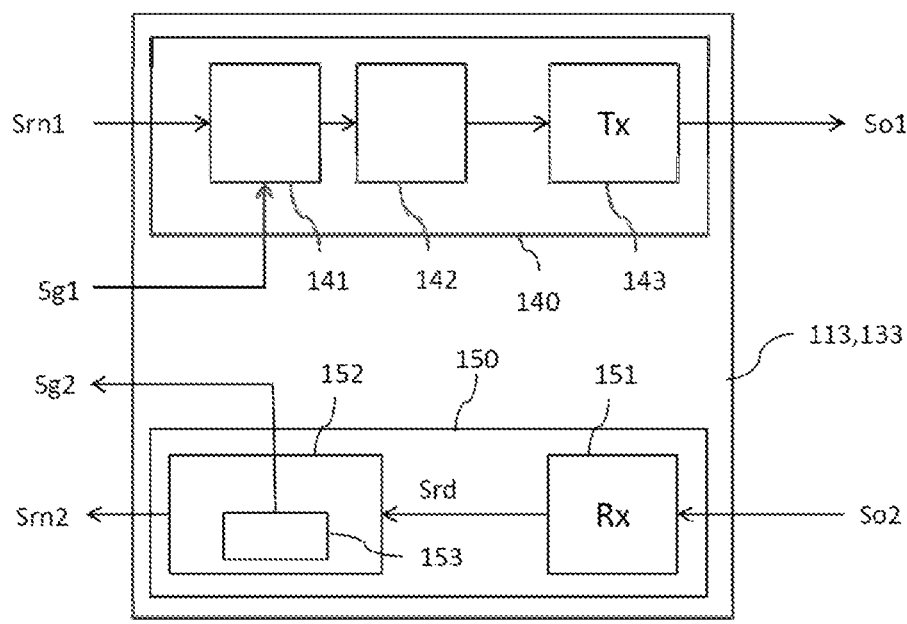
Figure 3:
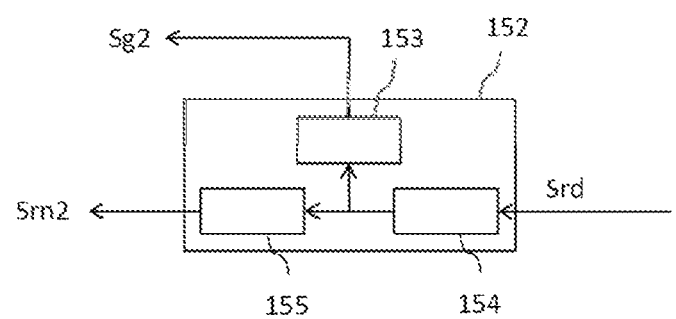

Other advantages and features of the invention will appear more clearly on reading the following description of a particular embodiment of the invention, given as a simple, illustrative and non-restrictive example, and appended drawings, in which:

FIG. 1 schematically presents a radio-over-fiber transmission system comprising optoelectronic transponders according to the prior art, FIG. 2 presents an example of a structure of an optoelectronic transponder, according to one aspect of the invention, FIG. 3 presents an example of a digitizing module of the optoelectronic transponder, according to one aspect of the invention, FIG. 4 presents an example of a reception module of the optoelectronic transponder, according to an alternative embodiment of the invention, FIG. 5 schematically presents a radio-over-fiber transmission system comprising optoelectronic transponders according to one aspect of the invention, FIG. 6 presents an example of implementation of the method for adding a management signal, according to one embodiment of the invention, FIG. 7 presents an example of implementation of the method for extracting a management signal, according to one embodiment of the invention.

5. DETAILED DESCRIPTION OF AT LEAST ONE EMBODIMENT OF THE INVENTION

In the rest of the description, examples are presented of embodiments of the invention based on the RRH-BBU architecture introduced with 3G, but the invention also applies to other systems wherein an electrical data signal, whether or not intended to be radio broadcast, has to be combined with a management signal then carried in an optical signal, such as the 2G and 4G mobile and WiMAX systems.

FIG. 1 schematically presents a radio-over-fiber transmission system according to the prior art comprising optoelectronic transponders according to the prior art.

The antenna site in the left-hand part of the figure comprises an element for processing a radio broadcast signal RRH 10, one or more antennas 11, and a site infrastructure represented for the sake of simplification by a single cabinet (or rack) 12, housing, for example, a power source powering the antennas 11. Not all the elements of the site infrastructure are represented, such as a fence, a door, a pylon, etc.

The optical signal So4λ, comprising 4 wavelengths, carried in the cable 20, is processed by an optical mux/demux (multiplexer and demultiplexer) 14, which separates the 4 wavelengths λ1, λ2, λ3, λ4 corresponding respectively to the DRoF signal Sm itself, the alarm signal S2, the tilt signal S3, and the optoelectronic parameterization signal S4.

"Wavelength" should be understood to mean "wavelength pair" when the optical signal is bidirectional. The DRoF signal is bidirectional, for example, but the management signals may be unidirectional. The wavelengths λ1, λ2, λ3, λ4 may, for example, be "CWDM" wavelengths, spaced 20 nm apart from each other in a range from 1271 nm to 1611 nm.

The part of the optical signal of wavelength λ1, corresponding respectively to the signal Srn which is strictly speaking the DRoF signal, is processed by a transponder 13, responsible for the conversion between optical signal and radio broadcast digital signal. This transponder is configurable with the aid of the optoelectronic parameterization signal S4.

Other elements of the RRH 10, notably those located between the transponder 13 and the antenna 11, are not represented for the sake of clarity, such as, for example, a digital signal processor.

A control unit 15 having a role similar to the transponder, is responsible for the conversion between wavelengths λ2, λ3, λ4 and electrical signals S2, S3 and S4, used respectively by the cabinet 12, the antenna 11 and the transponder 13. Alternatively, there may be one control unit per type of management signal S2, S3 or S4.

The management center site in the right-hand part of the figure comprises a digital signal processing element BBU 30, and other elements not represented such as, for example, an alarm management module, a tilt management module, and an optoelectronic parameterization management module.

The digital signal processing element BBU 30 comprises, similarly to the radio broadcast signal processing element RRH 10, an optical mux/demux 34, a transponder 33 and a control unit 35, the assembly allowing the conversion between optical wavelengths carried via the cable 20 and the corresponding digital electrical signals.

FIG. 2 presents an example of a structure of an optoelectronic transponder, according to one aspect of the invention.

The optoelectronic transponder 100 comprises a transmission module 140 accepting as input a digital radio signal Srn1, and a management signal Sg1, which is in digital electrical form.

The transmission module 140 comprises an addition module 141, e.g. an electronic mixer, which accepts as streaming input the bits of each of the two digital signals Srn1 and Sg1, in order to output a digital signal combining both signals mixing their respective bits in an order and at a frequency respecting the respective throughput of same. Thus, it is possible, for example, on a remote RRH or BBU entity obtaining the combined signal, to extract from this combined signal each of the component signals thereof, simply by knowing the respective throughputs of the signals Srn1 and Sg1, or by knowing one of the two throughputs and the throughput ratio thereof with the other.

The combined digital signal is then supplied as the input of a control circuit 142 controlling a laser diode Tx of a transmission port 143 transmitting an optical signal So1, a port to which an optical fiber of a cable 20 may be connected.

The optoelectronic transponder 100 also comprises a reception module 150 accepting on a reception port 151 an optical signal So2, e.g. from an optical fiber of a cable 20 connected to the port Rx 151.

The optical signal So2 is demodulated into a demodulated radio signal Srd, e.g. by a photodiode of the port 151, and this signal Srd is digitized by a digitizing module 152 in order to produce a digital radio signal Srn2. Inter alia, the module 152 comprises an extraction module 153 capable of extracting a management signal Sg2 from the signal Srd. The digitizing module 152 is detailed in FIG. 3.

FIG. 3 presents an example of a digitizing module of the optoelectronic transponder, according to one aspect of the invention.

According to this example, the signal Srd is amplified by an amplifier 154, and the amplified signal Srd is clipped by a clipper 155 in order to produce the signal Srn2.

The amplified signal Srd is divided into two parts, the first part being submitted as input to the extraction module 153, which may take the physical form of a low-pass filter. This low-pass filter is adjusted to retain only the low throughput part of the signal Srd amplified by the amplifier 154, in order to produce the management signal Sg2. The second part of the amplified signal Srd is submitted as input to the clipper 155.

The amplifier 154 and the clipper 155 may be combined in a single component called a "limiting amplifier" in English, on condition of it being possible to retrieve the amplified signal Srd for the low-pass filter.

Optionally, before or after passing into the clipper 155, the signal may further be submitted as input to a high-pass filter (not illustrated) in order to remove the management signal from the amplified signal Srd. Thus, the potential impact of the management signal on the integrity of the DRoF signal is completely eliminated.

FIG. 4 presents an example of a reception module of the optoelectronic transponder, according to an alternative embodiment of the invention.

According to this alternative embodiment to that described in relation to FIG. 2, the reception module 150 of the optoelectronic transponder comprises a "one-to-two" coupler 156 capable of sampling a part of the received signal So2, e.g. 10% of the signal, in order to introduce same as the input of an extraction module 157 comprising a low bandwidth photodiode, capable of directly demodulating a low throughput signal, then presenting this low throughput signal as the input of a digitizing module 158 in order to produce the management signal Sg2 per se. The remaining 90% of the optical signal So2 is presented as the input of the photodiode of the port 151, in order to be demodulated in the demodulated radio signal Srd, which is then digitized by a digitizing module 159 in order to produce the digital radio signal Srn2.

In this embodiment, the digitizing module is simplified as it does not comprise the extraction module, since the extraction of the management signal is already performed in the optical part of the reception module.

FIG. 5 schematically presents a radio-over-fiber transmission system comprising optoelectronic transponders according to one aspect of the invention.

The antenna site in the left-hand part of the figure and the management center in the right-hand part differ from those of the prior art in FIG. 1, inter alia by the absence of the two optical mux/demux, as thanks to the transponders 113 and 133 according to the invention, a single wavelength Al suffices for carrying, via the optical cable 20, a signal So comprising both the DRoF signal itself, and the information relating to the management signals S2, S3 and S4.

The control unit 115 processes the management signal Sg extracted or added by the transponder 113, and performs the conversion between this signal and the management signals S2, S3 and S4 usable respectively by the site infrastructure for the alarms, by the site antenna or antennas, and by the transponder 113.

The control unit 135 processes the management signal Sg extracted or added by the transponder 133, and performs the conversion between this signal and management signals usable by one or more management applications intended for the mobile network operator, not illustrated.

The bidirectional signals Sg in FIG. 5, corresponding to the unidirectional signals Sg1 and Sg2 in FIGS. 2 and 3, are electrical and not optical signals, which simplifies the control units 115 and 135 and makes them less expensive than the control units 15 and 35 according to the prior art.

FIG. 6 presents an example of implementation of the method for adding a management signal, according to one embodiment of the invention.

The method is implemented by a transponder compliant with that which has just been described, e.g. the transponder 113 in FIG. 5.

In a step E1, the transponder 113 adds a management signal to a digital radio signal, e.g. according to the technique of the addition module 141 described above, the throughput of the digital radio signal being, for example, 1000 times that of the management signal.

In a step E2, the transponder 113 modulates the radio signal augmented by the management signal in order to produce an optical signal of a single wavelength λ1.

In a step E3, the transponder 113 transmits the optical signal over an optical fiber, to another transponder compliant with that which has just been described, e.g. the transponder 133 in FIG. 5.

FIG. 7 presents an example of implementation of the method for extracting a management signal, according to one embodiment of the invention.

The method is implemented by a transponder compliant with that which has just been described, e.g. the transponder 133 in FIG. 5 comprising the digitizing module of FIG. 3.

In a step F1, the transponder 133 receives an optical signal of wavelength λ1 from another transponder compliant with that which has just been described, e.g. the transponder 113 in FIG. 5.

In a step F2, the transponder 133 demodulates the optical signal in order to produce a demodulated radio signal.

In a step F3, the transponder 133 digitizes the demodulated radio signal, e.g. according to the technique of the module 152 described above, in order to produce a digitized radio signal while extracting a management signal, the throughput of which is, for example, 1000 times less than that of the digital radio signal.

In the case of a reception module compliant with that described in relation to FIG. 4, the method for extracting a management signal differs from that which has just been described in that the step of extracting precedes the steps of demodulating and digitizing the management signal.

The embodiments of the invention that have just been described are only some of the conceivable embodiments. They demonstrate that the invention makes it possible to remotely manage at least three different aspects of an antenna site for mobile telecommunications: the processing of the alarms, the antenna tilt control and the management of the optoelectronic parameters of the conversion between radio broadcast signals and optical signals, without modifying the optical signal carrying the radio broadcast signal, and without modifying the optical components. The invention is suited to all DRoF system configurations with RRH entities linked by optical cable to a BBU entity, regardless of the protocols used for managing alarms, tilt and optoelectronic parameters, e.g. CPRI, OBSAI, ORI, etc.

The invention claimed is:

1. An optoelectronic transponder for a radio-over-fiber transmission system, comprising:
    an optical transmission module configured to modulate a first digital radio signal in order to obtain a first optical signal;
    an optical reception module configured to receive a second optical signal and demodulate the second optical signal in order to obtain a demodulated radio signal; and
    a digitizing module configured to digitize the demodulated radio signal in order to obtain a second digital radio signal;
    wherein the transmission module comprises:
        an addition module configured to add a first management signal to the first digital radio signal, wherein throughput of the first management signal is less than that of the first digital radio signal;
    wherein the optical digitizing module comprises:
        an extraction module configured to extract a second management signal from the demodulated radio signal, wherein throughput of the second management signal is less than that of the second digital radio signal; and
    wherein a ratio of the throughput of the first or second radio signal to the throughput of the first or second management signal respectively is greater than or equal to 1000.

2. The optoelectronic transponder as claimed in claim 1, wherein the addition module comprises an electronic mixer.

3. The optoelectronic transponder as claimed in claim 1, wherein the digitizing module comprises an amplifier configured to amplify the demodulated radio signal, and wherein the extraction module is a low-pass electronic filter connected to an output of the amplifier.

4. The optoelectronic transponder as claimed in claim 1, wherein the ratio of the throughput of the first radio signal to the throughput of the first management signal is identical to the ratio of the throughput of the second radio signal to the throughput of the second management signal.

5. The optoelectronic transponder as claimed in claim 1, wherein the management signal comprises information relating to alarms detected on a radio antenna site.

6. The optoelectronic transponder as claimed in claim 1, wherein the management signal comprises information relating to a radio antenna tilt control.

7. The optoelectronic transponder as claimed in claim 1, wherein the management signal comprises information relating to management of the optoelectronic parameters of the optoelectronic transponder.

8. The optoelectronic transponder as claimed in claim 1, wherein the optical transmission module transmits the first optical signal over an optical fiber, and wherein the optical reception module receives the second optical signal over the same optical fiber.

9. A radio-over-optical-fiber transmission system connecting a management center to at least one radio antenna site, wherein:
   the management center comprises an optoelectronic transponder as claimed in claim 1, and
   each of the at least one antenna sites comprises a transponder as claimed in claim 1, with which a separate pair of wavelengths is associated.

10. A method performed by a first optoelectronic transponder and comprising: adding a first management signal into a first digital radio signal for a radio-over-fiber transmission system, wherein throughput of the first management signal is less than that of the first digital radio signal; modulating the first digital radio signal in order to obtain a first optical signal; transmitting the first optical signal to a second optoelectronic transponder, receiving a second optical signal from the second optoelectronic transponder; demodulating the second optical signal received in order to obtain a demodulated radio signal; digitizing the demodulated radio signal in order to obtain a second digital radio signal; and extracting a second management signal from the demodulated radio signal, wherein throughput of the second management signal is less than that of the second digital radio signal, and wherein a ratio of the throughput of the first or second radio signal to the throughput of the first or second management signal respectively is greater than or equal to 1000.

* * * * *